United States Patent [19]
Fukuroi et al.

[11] Patent Number: 4,946,512
[45] Date of Patent: Aug. 7, 1990

[54] SOLAR ENERGY COLLECTOR DEVICE

[75] Inventors: Takeo Fukuroi, Uozu; Shinichirou Yoshida; Akira Ohmura, both of Kurobe, all of Japan

[73] Assignee: Yoshida Kogyo K. K., Tokyo, Japan

[21] Appl. No.: 326,678

[22] Filed: Mar. 21, 1989

[30] Foreign Application Priority Data

Mar. 28, 1988 [JP] Japan .............................. 63-40956[U]

[51] Int. Cl.⁵ ........................................ H01L 31/058
[52] U.S. Cl. .................................... 136/248; 136/251; 136/291; 126/432; 126/450; 52/518; 52/519
[58] Field of Search ............... 136/248, 251, 291; 52/518, 519; 126/432, 450

[56] References Cited

U.S. PATENT DOCUMENTS 4,670,293  6/1987  Yamano et al. .................. 427/39

FOREIGN PATENT DOCUMENTS

1900069   9/1970  Fed. Rep. of Germany ...... 136/291
2806810   8/1979  Fed. Rep. of Germany ...... 136/291
55-32911  3/1980  Japan .
60-170433 11/1985  Japan .

Primary Examiner—Aaron Weisstuch
Attorney, Agent, or Firm—Hill, Van Santen, Steadman & Simpson

[57] ABSTRACT

A solar energy collector device is disclosed for selectively collecting an electrical energy and a thermal energy at the same time from a solar energy. The device comprises an inorganic-and-metal composite in the form of a roof tile or a wall-forming member which includes a solar battery exposed to sun rays and a heat medium passageway disposed underneath the battery. The density of distribution of a particulate inorganic substance within a metal mass is varied through the areas of the tile or wall member so as to effectively collect the respective energies without adversely affecting the interior conditions of a building in which the device is installed.

7 Claims, 8 Drawing Sheets

SOLAR ENERGY COLLECTOR DEVICE

BACKGROUND OF THE INVENTION

1. Field of the Invention

This invention relates to a device for collecting solar energy and more particularly to a device operatively associated with a roof of a building for obtaining an electric energy and thermal energy at the same time from the solar energy.

2. Prior Art:

Extensive research and development efforts have been made for the realization of the technology of making effective use of solar energy, i.e. to derive therefrom electric energy in a manner as disclosed for instance in Japanese Utility Model Laid-Open Publication No. 60-170433 and thermal energy as is known from Japanese Utility Model Laid-Open Publication No. 55-32911. To the best knowledge of the present applicant however, no useful technology has yet been made available for successfully deriving both electric and thermal energies at the same time from solar energy. This is mainly due to the following reasons.

Solar batteries in common use mostly rely on the use of silicon elements, and the output of such silicon batteries disadvantageously declines with an increase in the ambient temperature. Therefore, in the case where the solar batteries are installed in the roof tiles as proposed in the aforesaid prior publication, it becomes necessary to provide thermal insulation for the roofing. On the other hand, when converting the solar energy into heat energy, it would be a great advantage to form the roofing with highly heat-conductive material, in which instance, however, it would still be necessary to provide proper heat-insulating means so as to prevent possible adverse effect of heat upon the interior of the building or house. There is thus a technological contradiction in the attempt to efficiently derive electrical and thermal energies at the same time from the same source of solar energy.

SUMMARY OF THE INVENTION

It is therefore the primary object of the present invention to provide a solar energy collecting device associated with building component materials and capable of converting solar energy into both electrical and thermal energies at the same time with increased efficiency while eliminating or alleviating adverse effects of heat generation upon the interior of the building.

According to the invention, there is provided a solar energy collector means comprising a composite material of a particulate inorganic substance and a metal in the form of a roofing tile or an exterior wall member, a plurality of solar batteries disposed on an outer surface of the composite compound exposed to sun rays and a heating medium passageway underlying at least the region of the solar batteries. Alternatively, the passageway consists of a forward path extending underneath the batteries and a return path extending through the areas of the tile devoid of the batteries. The term "inorganic substance" includes what is known as Shirasu balloon (white porous volcanic ash precipitates produced typically in the Kyushu Island of Japan, tuff loam, diatomaceous earth, glass fibers, and other granular or fibrous materials. By the term "metal" as used herein is meant aluminum, copper, their alloys, and other heat-conductive metals.

According to an important aspect of the invention, the density of distribution of the inorganic substance is low (namely, coarse) at the outer surface of the roof or wall exposed to sun rays and high (namely, fine) at the inner surface which underlies the heating medium passageway.

According to another important aspect of the invention, the density of distribution of the inorganic substance is high (or fine) at the forward path portion of the heating medium passageway and low (or coarse) at the return path portion.

A roofing member or tile formed from the aforesaid composite material according to the invention is provided with upper and lower notches or cut-away recesses at diagonally opposed corner portions of the tile and a connecting port at an end face of each of the cut-away recesses communicating with the heating medium passageway.

The above and other objects and features of the present invention will be apparent from the following description taken in connection with the accompanying drawings. Like reference numerals refer to like or corresponding parts throughout the several views.

DETAILED DESCRIPTION OF THE PREFERRED EMBODIMENTS

Figure 6:
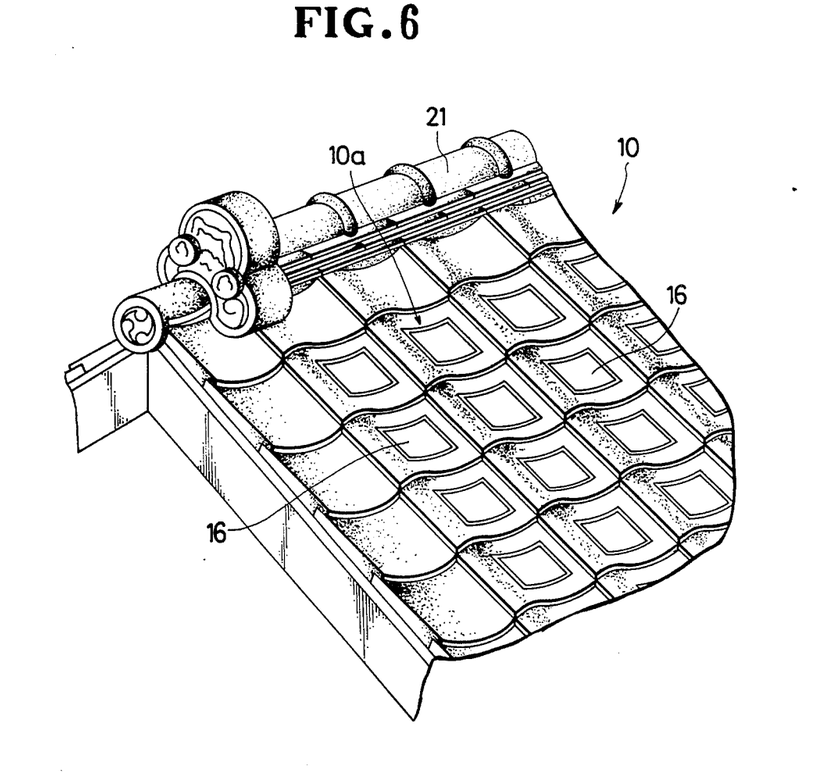
FIG. 6 is a perspective view of a tile assembly as mounted in a typical oriental type of house.

Referring now to the drawings and firstly to FIGS. 1 through FIG. 4, there is shown a roofing tile assembly 10 which constitutes a solar energy collector according to the invention and which is made from a composite material comprising a granular or fibrous inorganic substance I of the class defined as above and a metal M of the class also defined as above. Each individual tile 10a is formed for instance by injection-molding from a metal hot melt and granular or fibrous mix into a generally square block as better shown by the perspective views of FIGS. 6 and 7. Each tile 10a has a hook member 11 (see FIG. 2) extending downwardly from one of its ends and held in hooked engagement with a lug 12 anchored to a sloped support base or batten 13. A plurality of tiles 10a are partly superimposed at adjacent end portions and interconnected in a cascade fashion as better shown in FIG. 2. At diagonally opposed corners of the tile 10a (see FIG. 1) are formed an upper cut-away recess 14 and a lower cut-away recess 15.

Figure 1:
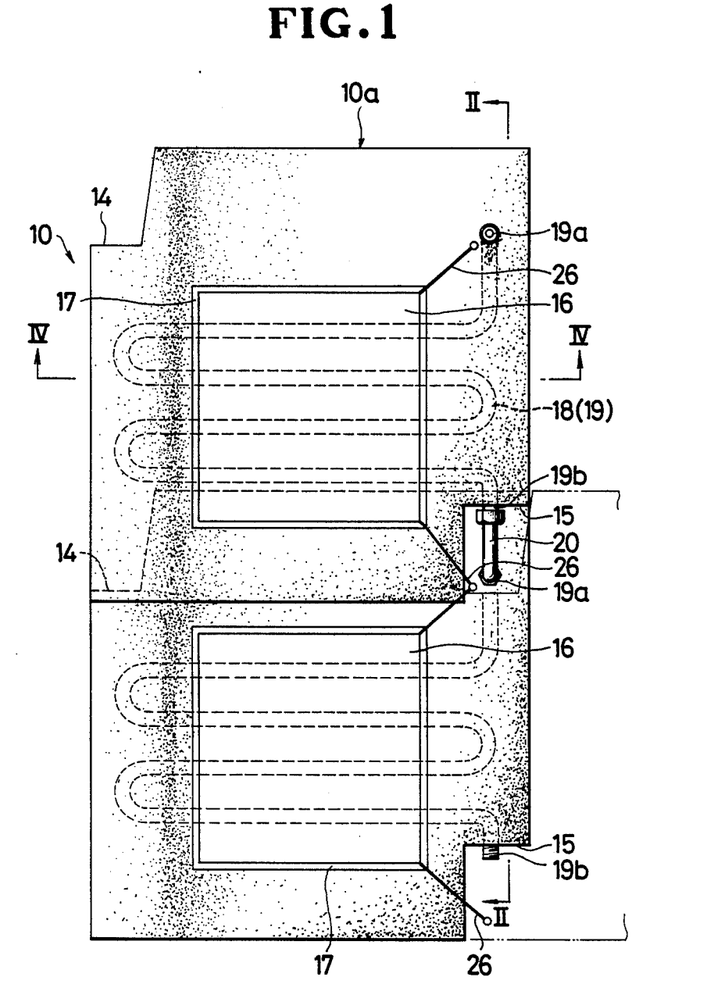
FIG. 1 is a plan view of a roofing tile assembly constituting a solar energy collector according to the invention.

A solar battery 16 rimmed with a square plastic heat insulator 17 is mounted centrally on and flush with the outer surface of each tile 10a which is directly exposed to sun rays.

Figures 2, 3:
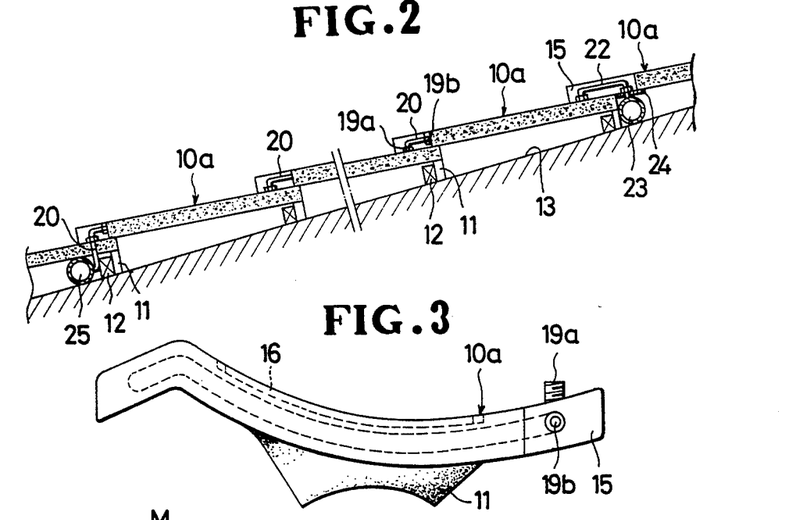
FIG. 2 is a cross-sectional view taken on the line II—II of FIG. 1.
FIG. 3 is a side elevational view of an individual roof tile.
Figure 7:
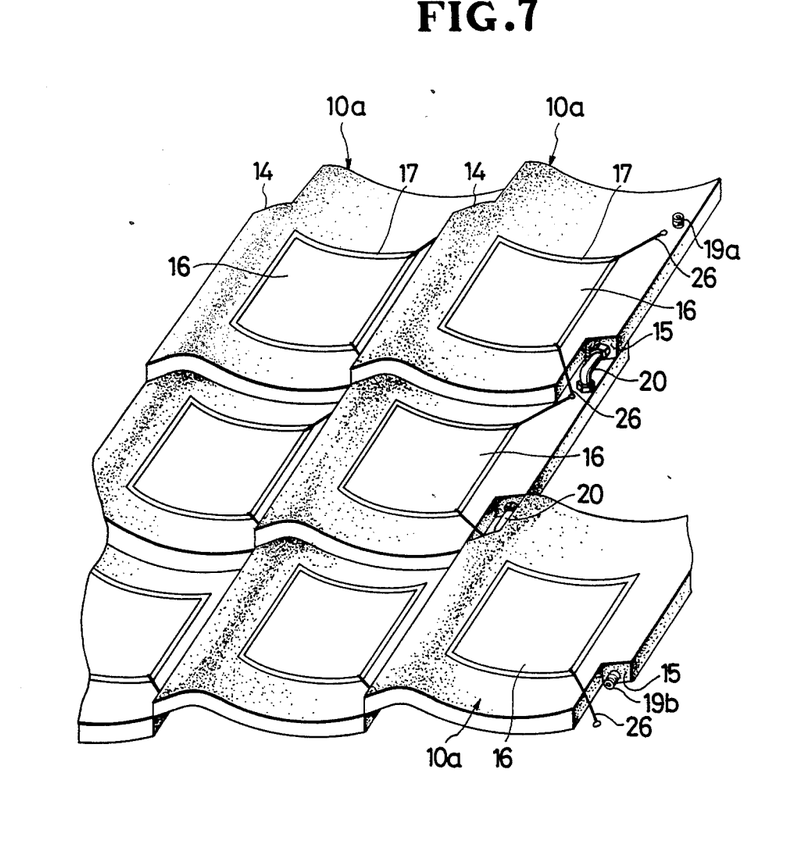
FIG. 7 is an enlarged scale fragmentary perspective view of the assembly of FIG. 6.

A heating medium passageway 18 formed by a conduit 19 extends through the tiles 10a along a meandering path and is preferably concentrated underneath the region of the solar batteries 16. The conduit 19 has its inlet end 19a vertically projecting into the lower cut-away recess 15 of an upstream tile 10a and its outlet end 19b horizontally projecting from the end face of the recess 15 and over the downstream tile 10a as shown in FIGS. 1, 2 and 7. The inlet ends 19a of the conduits 19 of the downstream tiles 10a are connected successively by coupling pipes 20 with the outlet ends 19b of the conduits 19 of the upstream tiles 10a.

As shown in FIG. 2, the lower cut-away recess 15 in the uppermost tile 10a adjacent to the apex ridge 21 of the roof (FIG. 6) is larger than the rest of the corresponding recesses elsewhere to provide space accommodating a larger coupling pipe 22 for connecting a heating medium supply tube 23 in flow communication with the terminal inlet 19a of the conduit 19 via sealing member 24. The outlet 19b of the conduit 19 is connected in flow communication with a heat medium withdrawal tube 25. Lead wires 26 of adjacent solar batteries 16 extend through the lower recesses 15 and are interconnected with one another as shown in FIGS. 1 and 7.

Figure 4:
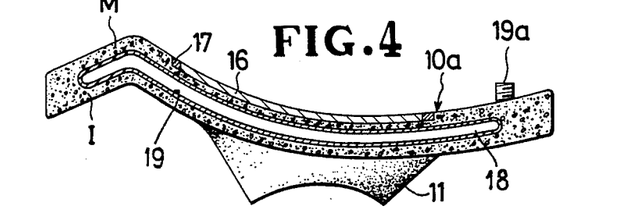
FIG. 4 is a cross-sectional view taken on the line IV—IV of FIG. 1.

The particulate inorganic substance I is substantially uniformly distributed in the metal M in the case of the tiles 10a shown in FIG. 4.

Figure 5:
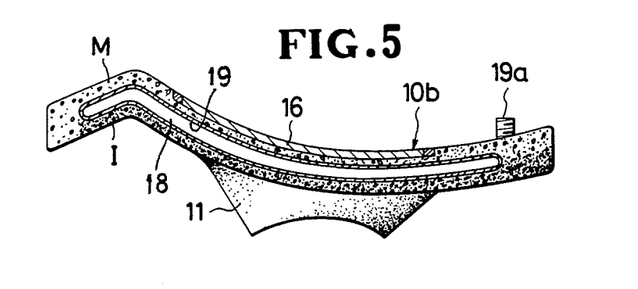
FIG. 5 is a view similar to FIG. 4 but showing a modified tile.
Figure 8:
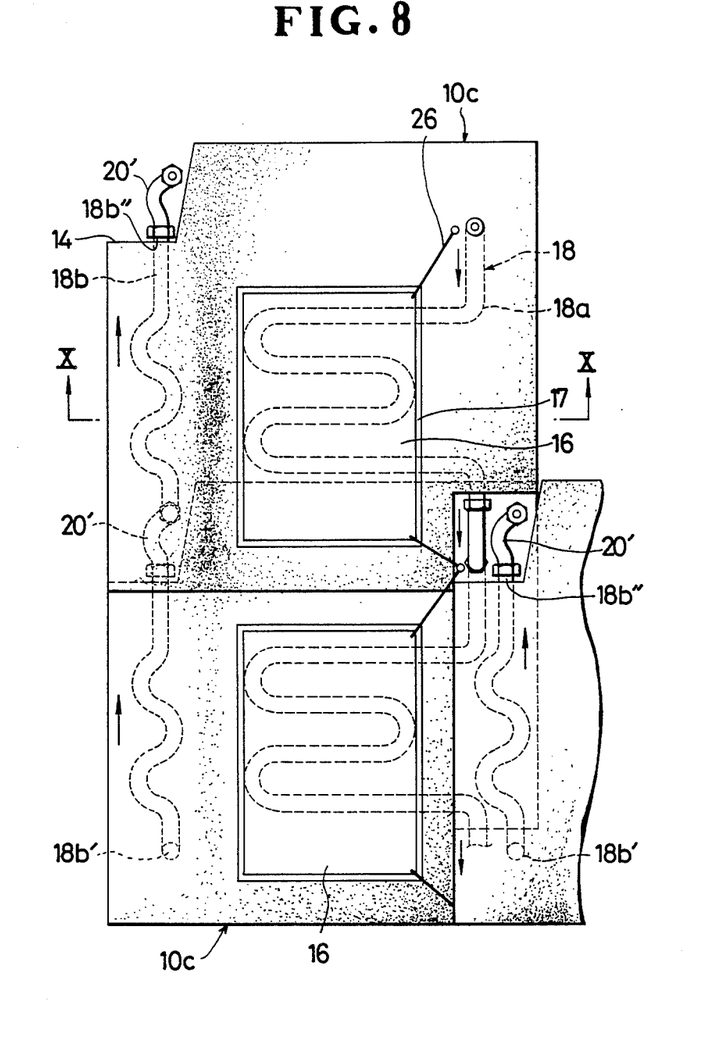
FIG. 8 is a plan view of a modified tile assembly.
Figure 9:
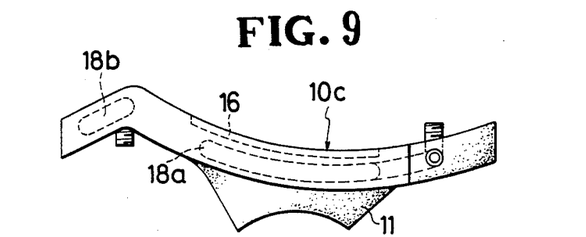
FIG. 9 is a side elevational view of an individual tile of the assembly shown in FIG. 8.
Figure 10:
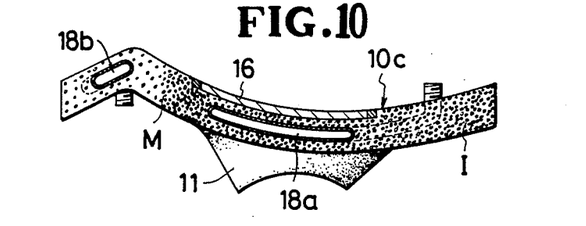
FIG. 10 is a cross-sectional view taken on the line X—X of FIG. 8.

In the embodiment shown in FIG. 5, the density of distribution of the inorganic substance I is relatively low at the portion of the tile 10b which overlies the passageway 18 and relatively high at the tile portion which underlies the passageway 18, the remaining details of the tile 10b being identical with those of the tile 10a. The construction of a tile 10c shown in FIGS. 8–10 is quite similar to that of the tile 10a except that the passageway 18 for a heating medium consists of a forward path 18a and a return path 18b. The forward path 18a extends in a meander form as in the tile 10a and underlies the solar battery 16 on each tile 10c. The return path 18b is formed in the transverse portion of each tile 10c which is superposed on a neighboring tile 10c and which is devoid of the solar battery 16. An inlet end 18b' of the return path 18b in a downstream tile 10c is disposed in a portion corresponding to the upper recess 14 and directed downwardly into the recess 14 thereto, while an outlet end 18b" of the path 18b projects above the upper recess 14. The inlet 18b' in an upstream tile 10c and the outlet 18b" in a downstream tile 10c are joined together by a flexible coupling pipe 20' so that the heating medium flows in the direction of the arrows as shown in FIG. 8. The density of distribution of the inorganic substance I, as shown in FIG. 10, is high at the region of the tile 10c surrounding the forward path 18a and low at the region surrounding the return path 18b. This varied density can be achieved by initially placing a predetermined amount of inorganic substance I in a mold cavity where its density is to be increased and thereafter molding a hot melt of metal M containing decreasing proportions of inorganic substance I.

Figure 11:
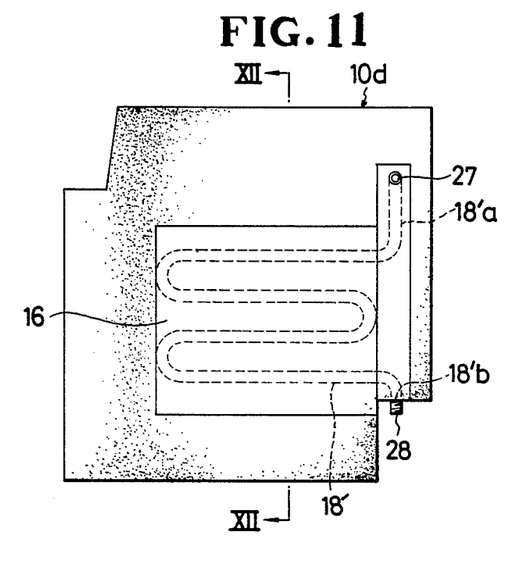
FIG. 11 is a plan view of a further modified tile.
Figure 12:
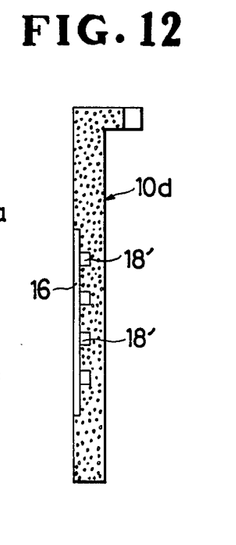
FIG. 12 is a cross-sectional view taken on the line XII—XII of FIG. 11.

A modified tile 10d shown in FIGS. 11 and 12 is characterized by the provision of a heating medium passageway 18 in the form of an elongated channel 18' whose upper surface is exposed to the atmosphere when the tile 10d is formed. The majority of the elongate channel 18' is covered by the solar battery 16 and has an inlet 18'a and an outlet end 18'b covered by an extension of the material of the solar battery 16 and connected to plugs 27 and 28, respectively.

Figure 13:
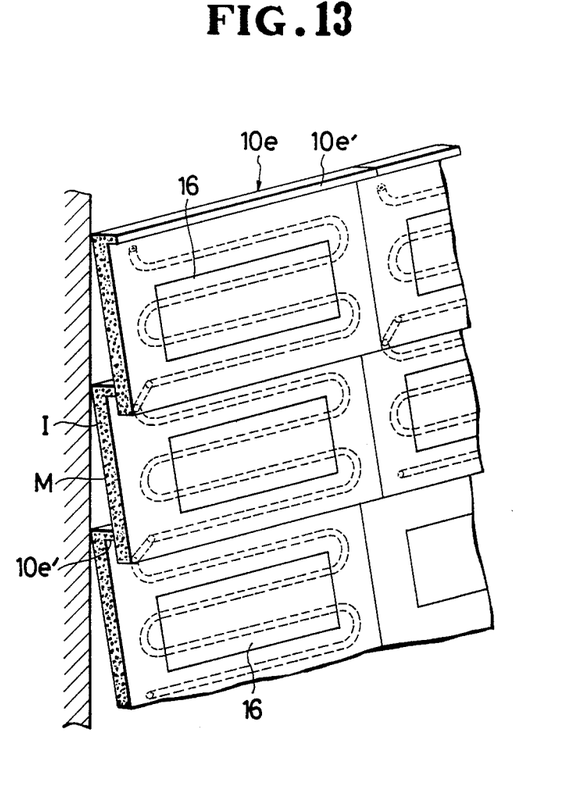
FIG. 13 is a perspective view of an assembly of wall-forming members embodying the invention.

FIG. 13 shows an exterior wall-forming member 10e to which the principles of the invention are applied. Each wall-forming member 10e is a flat square or rectangular plate having a refractive ridge 10e, a plurality of such members 10e being superimposed one upon another along the refractive ridge 10e' so that when assembled, they are angularly displaced with respect to the plane of the ground to permit effective reception of sun rays.

Figure 14:
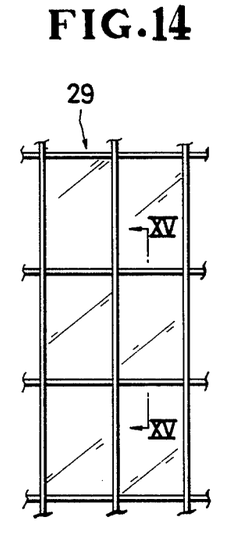
FIG. 14 is a front elevational view of a curtain wall.
Figure 15:
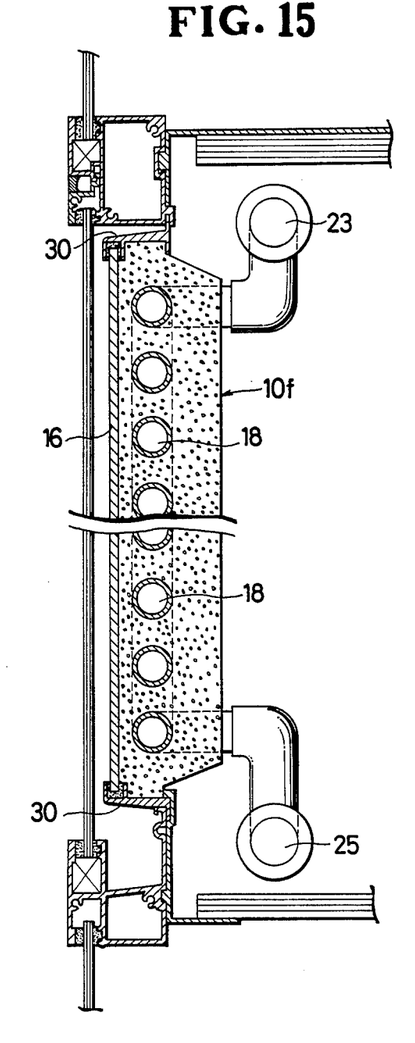
FIG. 15 is a cross-sectional view taken on the line XV—XV of FIG. 14.

FIG. 14 shows a curtain-wall 29, to the interior side of which is installed a wall-forming member 10f as shown in FIG. 15. The physical characteristics and performance of the wall-forming member 10f are substantially the same as the various embodiments already described. The member 10f is supported in place by brackets 30 disposed interiorly of the curtain-wall 27, and it has a heating medium passageway 18 embedded therein whose inlet and outlet are connected to a heat medium supply tube 23 and a withdrawal tube 25, respectively.

Obviously, various modifications and variations of the present invention are possible in the light of the above teaching. It is therefore to be understood that within the scope of the appended claims the invention may be practiced otherwise than as specifically described.

What is claimed is:

1. A solar energy collector device comprising a composite material comprising a particulate inorganic substance and a metal in the form of a roofing tile or an exterior wall member, at least one solar battery disposed on an outer surface of said tile or wall member exposed to sun rays, and a heating medium passageway underlying at least the region of said tile or wall member where said solar batteries are located.

2. A solar energy collector device as claimed in claim 1 wherein said particulate inorganic substance is selected from the group consisting of Shirasu balloon, tuff loam, diatomaceous earth, and glass fiber, and said metal is selected from the group consisting of aluminum, copper, and their alloys.

3. A solar energy collector device as claimed in claim 1, wherein the density of distribution of said particulate inorganic substance in said composite material is higher at the portion of said tile or wall member which underlies said passageway than at the portion which overlies said passageway.

4. A solar energy collector device as claimed in claim 1, wherein said heating medium passage is comprised of a forward path extending underneath said solar batteries and a return path extending through the areas of said tile or wall member which are devoid of said batteries, the density of distribution of said inorganic substance in said composite material being higher at said forward path than at said return path.

5. A solar energy collector device comprising a composite material comprising a particulate inorganic substance and a metal in the form of a roofing tile or an exterior wall member, at least one solar battery disposed on an outer surface of said tile or wall member exposed to sun rays, and a heating medium passageway underlying at least the region of said tile or wall member where said at least one solar battery is located, said tile or wall member having an upper cutaway recess and a lower cut-away recess formed in diagonally opposed corners of said tile or wall member and a connecting port at an end face of each of said cut-away recesses communicating with said passageway.

6. A solar energy collector device as claimed in claim 1 or 5 wherein said passageway is in the form of a conduit.

7. A solar energy collector device as claimed in claim 1 or 5 wherein said passageway is in the form of an open channel.

* * * * *